United States Patent
Helbing et al.

(10) Patent No.: US 7,547,869 B2
(45) Date of Patent: Jun. 16, 2009

(54) ILLUMINATION SYSTEM CALIBRATION AND OPERATION HAVING A CALIBRATION MATRIX CALCULATION BASED ON A SHIFT IN COLOR SPACE

(75) Inventors: Rene Helbing, Palo Alto, CA (US); Erik Halvordsson, Stuttgart (DE); Keat Boon Tan, Penang (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 62 days.

(21) Appl. No.: 11/944,206

(22) Filed: Nov. 21, 2007

(65) Prior Publication Data

US 2009/0127431 A1 May 21, 2009

(51) Int. Cl.
*G01J 1/32* (2006.01)
(52) U.S. Cl. ............................ 250/205; 250/214 R
(58) Field of Classification Search ............ 250/205, 250/214 R, 226, 559.1; 362/612, 509, 184, 362/185, 800; 315/307, 308
See application file for complete search history.

(56) References Cited

U.S. PATENT DOCUMENTS

| | | | |
|---|---|---|---|
| 7,012,633 B2 * | 3/2006 | Jenkins | ............. 348/180 |
| 2007/0035740 A1 | 2/2007 | Nisper | |
| 2007/0051881 A1 | 3/2007 | Ashdown | |

* cited by examiner

*Primary Examiner*—Que T Le

(57) ABSTRACT

A method for calibrating an illumination system is disclosed herein. The illumination system comprises at least one light emitter and at least one color sensor. The method comprises emitting a first wavelength of light from the a light emitter and measuring the color of light emitted by the light emitter using the color sensors. A second wavelength of light is emitted from the a light emitter and the color of light emitted by the light emitter is measured using the color sensors. The shift in color space based on the measurements is calculated. At least one calibration matrix based on the shift in colors space is calculated.

24 Claims, 2 Drawing Sheets

ILLUMINATION SYSTEM CALIBRATION AND OPERATION HAVING A CALIBRATION MATRIX CALCULATION BASED ON A SHIFT IN COLOR SPACE

BACKGROUND

Color illumination systems use a plurality of different colors emitters to display a wide range of colors. Some illumination systems use red, green, and blue emitters. Others illumination systems use different colors, such as red, green, blue, and amber. Combinations of these colors are used to emit the wide range of colors emitted by the illumination systems.

In order to be sure the correct colors are emitted by the illumination system, a plurality of color sensors or detectors are located proximate the emitters. The sensors measure the intensity of light emitted by their associated emitters, which enables the ratio of light to be calculated for specific areas of the illumination system. As noted above, the ratio of light determines the color of light emitted by the illumination system.

The calculated ratio of light is compared to the ratio of light that is supposed to be emitted by an illumination system and corrections are made to correct the color. For example, a specific color having a 20% red, 20% green, and 60% blue is supposed to be emitted. If the color sensors detect other ratios, the ratios will be corrected by an illumination color management system or the like associated with the illumination system.

In order to provide accurate feedback as to the actual colors being emitted, the color sensors have to be precisely calibrated. As the gamut of colors that is able to be emitted increases, the accuracy of the calibration needs to be increased.

DETAILED DESCRIPTION

Figure 1:
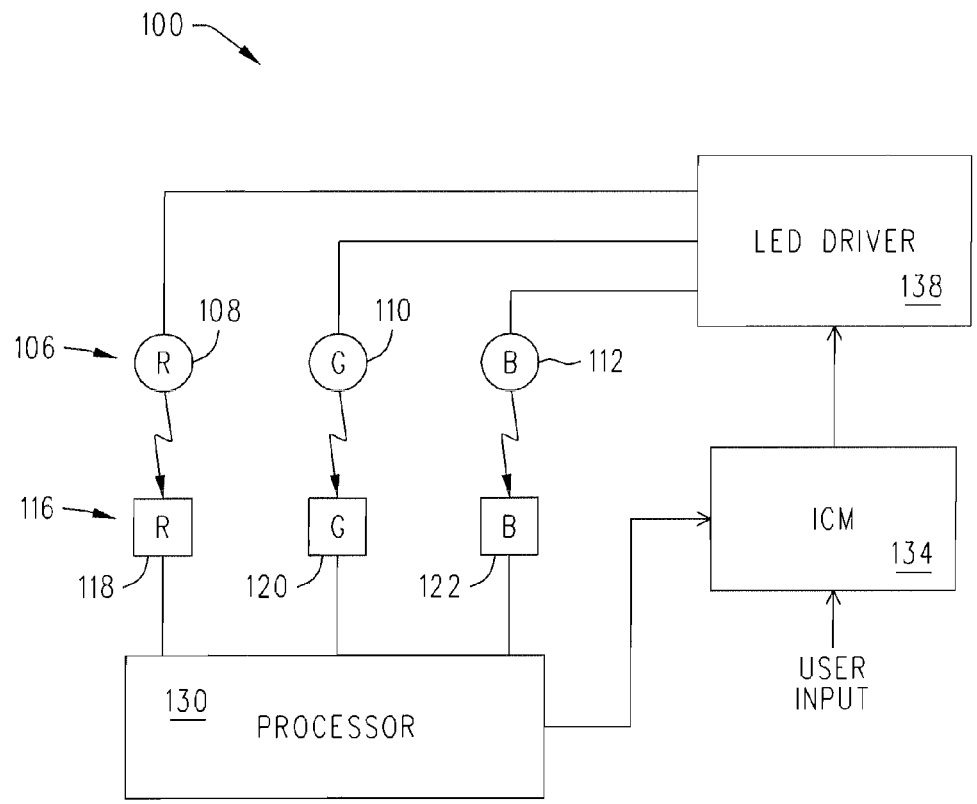
FIG. 1 is a schematic diagram of an embodiment of an illumination system.

A simplified version of a color illumination system 100 is shown in FIG. 1. The illumination system 100 of FIG. 1 includes a plurality of light emitters 106, which are described herein as being light emitting diodes (LEDs) 106. It is noted that emitters other than LEDs may be used in the illumination system 100. It is also noted that the term light emitter means a single source of light and not a combination of light sources. A combination of light sources refers to the illumination system 100. The LEDs 106 are referred to individually as the red LED 108, the green LED 110, and the blue LED 112. The color designations of the LEDs 106 refer to the general color appearance of the LEDs 106, which corresponds to the peak wavelength of light emitted by the LEDs 106. However, colors other than the above-described colors may be emitted by the LEDs 106.

Located proximate the LEDs 106 are a plurality of color sensors 116. The sensors may be located in area where the emission from the light emitters is well mixed. The color sensors 116 are referred to individually as a red sensor 118, a green sensor 120, and a blue sensor 122. Each of the sensors 116 detects a band of light or a bandwidth of wavelengths emitted by the corresponding LEDs 106. For example, the red sensor 118 detects a bandwidth of light centered around a wavelength of red light. The bandwidth may extend to the green and blue wavelengths.

The sensors 116 output a voltage, number, current, or other indicator, that is proportional to the intensity of light they receive. In the embodiment where the sensors 116 output voltages, a high voltage may be indicative of detection of a high intensity of light. Likewise a low voltage will be indicative of detection of a low intensity of light. Thus, when the sensors 116 are illuminated with a red light, the red sensor 118 will output a high voltage and the green sensor 120 and the blue sensor 122 will output relatively low voltages.

The sensors 116 are connected to a processor 130 that processes the data from the sensors 116. For example, the processor 130 may convert analog outputs from the sensors 116 to digital representations of the intensity of light received by the sensors 116. The processor 130 outputs this data to an illumination color management system (ICM) 134. As described in greater detail below, the ICM 134 analyzes the data from the processor 130 to correct the colors emitted by the illumination system 100. The ICM 134 receives data from user input, which may be digital data from a computer or processor indicative of the color desired to be output by the illumination system 100.

The ICM 134 outputs instructions or data to an LED driver 138. The instructions include the intensities of light to be emitted by the LEDs 106 in order to produce a desired color. As described in greater detail below, the ICM 134 analyzes or uses calibration data and the like in order to determine the intensities of light to be emitted by the LEDs 106. In some embodiments, the LED driver 138 uses pulse width modulation (PWM) signals to drive the LEDs 106. Therefore, the intensities of light emitted by the LEDs 106 are varied by varying the duty cycles of the PWM signals.

The illumination system 100 is required to be calibrated so that corrections applied by the ICM 134 are accurate. The ICM 134 corrects the colors per a calibration matrix. Reference is made to the CIE color space, which is used as a calibration standard for color. It is noted that other color standards may be used herein. Some conventional illumination systems use a single calibration matrix that is applied to colors within the entire CIE color space. As described herein, the illumination system 100 may use several different calibration matrices depending on the location of the desired color in the CIE color space. As described in greater detail below, slight wavelength shifts are induced into the emitters 106 and measured by the sensors 116, which provide for more accurate calibration matrices.

The below-described calibration techniques may be performed during manufacture of the illumination system 100 subsequent to mounting of the LEDs 106 and the sensors 116. After the illumination system 100 is manufactured, individual LEDs 106 are illuminated and their colors are measured using the sensors 116. With regard to the illumination system 100 of FIG. 1, there are three LEDs 106, therefore, three color points in the CIE space will have the above-described matrices applied thereto.

The calibration methods described herein may be performed by a computer or the like operating by way of a computer-readable medium, which includes firmware, magnetic media, optical media, and any other form of data storage. Computer code to perform the calibration may be stored on the computer-readable medium. The computer may be a component of the illumination system 100 or it may be associated with manufacturing devices. Values for the calibration matrices described herein may be transmitted to the illumination device 100 and stored therein.

The LEDs 106, and other light sources that may be used by the illumination system 100 do not always emit a single and constant wavelength of light. For example, the bandwidth of light emitted by the red LED 108 may be centered around a specific peak wavelength that is referred to as the wavelength for that specific red LED 108. For example, the wavelengths of the LEDs 106 will change slightly depending on the current passing through the LEDs 106. In addition, the wavelengths of the LEDs 106 will change as the temperature of the LEDs 106 change and with the age of the LEDs 106. These changes in the wavelengths emitted by the LEDs 106 may be known. For example, the data may be supplied by the manufacturer of the LEDs 106.

In one embodiment, the peak wavelength for the red LED 108 at an ambient temperature of 50.0 degrees Celsius is 639.1 nanometers. Values detected by the sensors 116 are 264.0 for the red sensor 118, 19.0 for the green sensor 120, and 4.0 for the blue sensor 122. When the ambient temperature is lowered to 30.0 degrees Celsius, the peak wavelength moves to 636.5 nanometers. At this wavelength, the red sensor 118 outputs a value of 288.0, the green sensor outputs a value of 20, and the blue sensor outputs a value of 5.0. More specifically, the wavelength of the peak output of the red led 108 was lowered by approximately 2.2 nanometers, which was detected by the sensors 116.

The peak wavelength output by the red sensor 108 may be increased by heating the red LED 108. When the red LED 108 is heated to 80.0 degrees Celsius, the peak wavelength moves to 641.5 nanometers. At this wavelength, the red sensor 118 outputs a value of 240.0, the green sensor outputs a value of 17.0, and the blue sensor outputs a value of 4.0. Accordingly, the peak wavelength increased 2.4 nanometers, which was detected by the sensors 116.

Similar changes to the peak wavelengths can be accomplished with regard to the green LED 110 and the blue LED 112. Accordingly, the peak wavelengths of all the LEDs 106 can be varied by varying the temperatures of the LEDs 106.

Another method of changing the peak wavelength of the LEDs 106 is by changing the drive current of the LEDs 106. In one embodiment, the red LED 108 outputs a peak wavelength of 635.9 nanometers with 20.0 mA drive current. At this wavelength, the red sensor 118 outputs a value of 289.0, the green sensor 120 outputs a value of 20.0, and the blue sensor outputs a value of 4.0. When the drive current is dropped to 5.0 mA, the peak wavelength drops to 634.6 nanometers, which is a change of 1.3 nanometers. At this current, the red sensor 118 outputs a value of 67.0, the green sensor 120 outputs a value of 8.0, and the blue sensor 122 outputs a value of 4.0. Thus, the difference in peak wavelength can be detected by the sensors 116.

At least one of the above-described techniques is applied to each of the LEDs 106 during manufacture in order to obtain calibration matrices. For example, the responses of the sensors 116 when the red LED 108 is illuminated may be obtained at several different and known wavelengths. Based on the sensor responses and the peak wavelengths, correction matrices, such as three by three matrices, may be calculated. The ICM 134 may use the matrices during operation in order to cause the illumination system 100 to output very precise colors. More specifically, the ICM 134 may use the correction matrices to correct values received by the sensors 116.

In some embodiments, the corrections may be applied based on operating conditions of the illumination system. For example, if the peak wavelength of a specific LED changes as the LED ages, the correction matrices may apply a correction based on the known peak wavelength changes. In other examples, the matrices may be applied based on temperature, wherein the peak wavelengths of the LEDs 106 change with temperature and the correction matrices have been calculated based on these temperatures.

Figure 2:
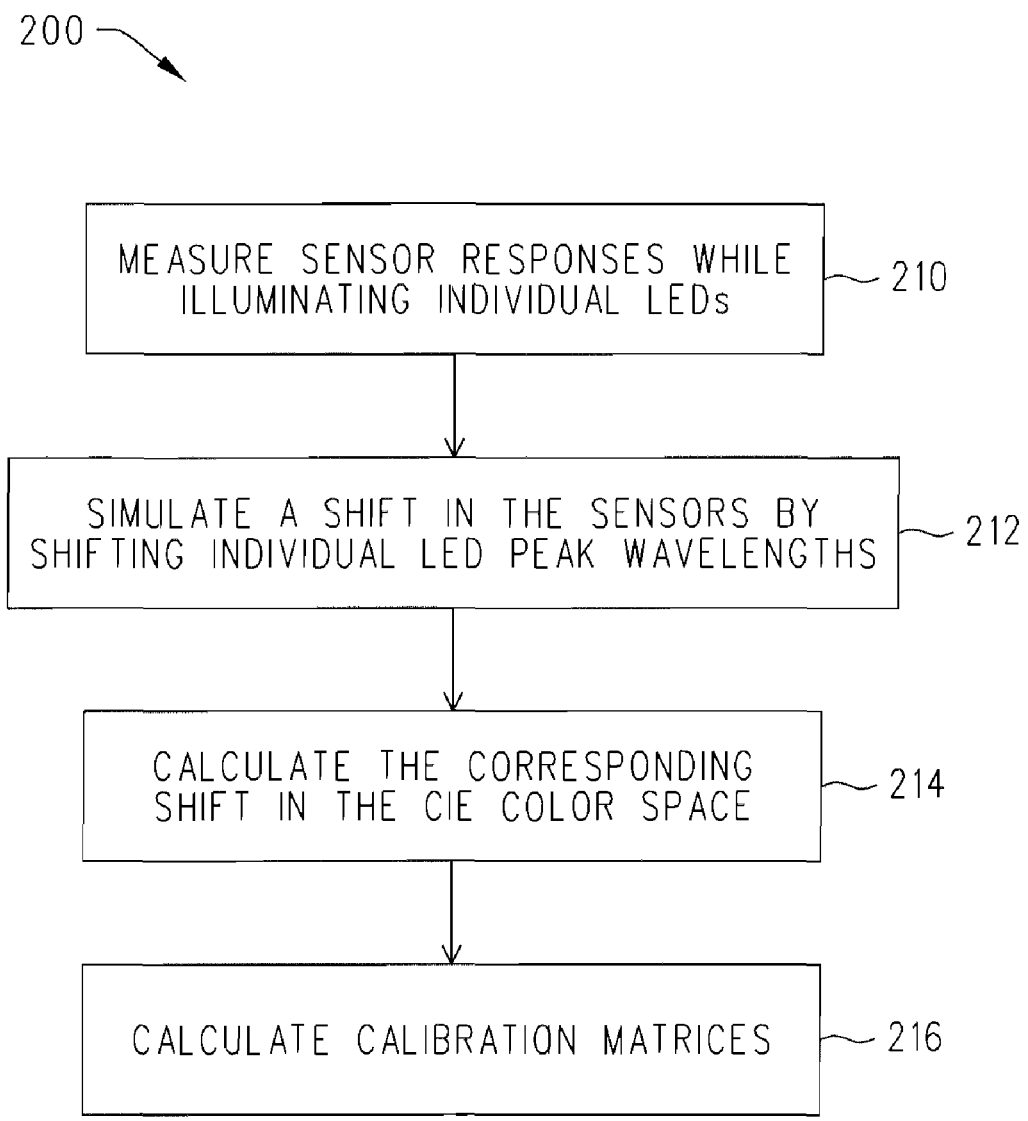
FIG. 2 is a flowchart describing an embodiment of a calibration method applied to the illumination system of FIG. 1.

Having described the illumination system 100 and the operation of the illumination system 100, the calibration will now be described with additional reference to the flow chart 200 of FIG. 2. At step 210, the sensor responses are measured while illuminating individual LEDs 106. For example, the red LED 108 may be illuminated while the green LED 110 and the blue LED 112 are turned off. The sensors 116 measure the light emitted by the red LED 108.

At step 212, a different response on the sensors 116 is induced by shifting the wavelengths of the individual LEDs 106 as described above. In addition, the wavelength shift can be simulated by using the known changes in the peak wavelengths depending on various operating conditions, such as drive current and temperature. In some embodiments, the peak wavelengths are both increased and decreased. With reference to the example of the red LED 108, the peak wavelength of the red LED 108 is shifted and measured again by the sensors 116.

In step 214, the corresponding shift in the CIE color space is calculated. More specifically, the shift in peak wavelength detected by the sensors 116 corresponds to a shift in the CIE color space, which is calculated. In step 216, the calibration matrices are calculated based on the CIE color space and the like. During operation of the illumination system 100, the correction matrices are applied in order to correct the colors sensed by the sensors 116 so that the feedback to the LED driver 138 is precise.

The calibration matrices may be three by three matrices. The three rows may represent the colors, red, green, and blue. The columns represent the values obtained by the shifts in wavelengths. For example, the middle column may be representations of values obtained at the prescribed wavelengths. The left column may be representations of values obtained using shorter wavelengths and the right column may be representations of values obtained using longer wavelengths. Similar matrices may be calculated based on CIE space. The matrices may be combined in order to calculate the correction matrix.

The calibration described herein may be applied to different locations in color space. More specifically, calibration matrices are calculated for all the sensors. Therefore, the calibration described herein calculates calibration matrices for a plurality of different color space locations. Thus, precise color control can be achieved. Conventional calibration techniques only generate one calibration matrix for all the color space, which does not provide for precise color management.

What is claimed is:

1. A method for calibrating an illumination system, said illumination system comprising at least one light emitter and at least one color sensor, said method comprising:

emitting a first wavelength of light from said at least one light emitter;

measuring the color of light emitted by said at least one light emitter using said at least one color sensor;

emitting a second wavelength of light from said at least one light emitter;

measuring the second color of light emitted by said at least one light emitter using said at least one color sensor;

calculating the shift in color space based on the measurements; and calculating at least one calibration matrix based on said shift in colors space.

2. The method of claim 1, wherein said emitting a second wavelength of light comprises shifting the peak wavelength emitted by said at least one light emitter in a first direction.

3. The method of claim 2 and further comprising emitting a third wavelength of light using said at least one light emitter, wherein said emitting a third wavelength of light comprises shifting the peak wavelength emitted by said at least one light emitter in a second direction opposite said first direction, and wherein said calculating the shift includes calculating the shift in color space of said third wavelength.

4. The method of claim 1, wherein said second wavelength of light differs from said first wavelength of light by approximately one nanometer.

5. The method of claim 1, wherein said emitting a second wavelength of light comprises changing the temperature of said at least one light emitter from the temperature of said at least one light emitter during emission of said first wavelength of light.

6. The method of claim 1, wherein said emitting a second wavelength of light comprises changing the current flow through said at least one light emitter from the current flow of said at least one light emitter during emission of said first wavelength of light.

7. The method of claim 1, wherein said at least one emitter is a light emitting diode.

8. The method of claim 1, wherein said illumination comprises a plurality of light emitters, and wherein said method further comprises turning on a single light emitter.

9. A method for calibrating an illumination system, said illumination system comprising a plurality of light emitters and a plurality of color sensors, said method comprising:
emitting a first color of light having a first peak wavelength using a first of said plurality of light emitters;
measuring said first color of light using said plurality of color sensors;
emitting a second color of light having a second peak wavelength using said first light emitter;
measuring said second color of light using said color sensors;
calculating the shift in color space based on the measurements; and
calculating at least one first calibration matrix based on said shift in colors space.

10. The method of claim 9, and further comprising turning off all of said plurality of light emitters except said first light emitter.

11. The method of claim 9, and further comprising:
turning off said first light emitter;
emitting a third color of light having a first peak wavelength using a second of said plurality of light emitters;
measuring said third color of light using said plurality of color sensors;
emitting a fourth color of light having a second peak wavelength using said second light emitter;
measuring said fourth color of light using said color sensors;
calculating the shift in color space based on the measurements; and
calculating at least one second calibration matrix based on said shift in colors space.

12. The method of claim 9, wherein said emitting a second color of light comprises shifting the peak wavelength emitted by said first light emitter in a first direction.

13. The method of claim 12 and further comprising emitting a fifth color of light using said first light emitter, wherein said emitting a fifth color of light comprises shifting the peak wavelength emitted by said first light emitter in a second direction opposite said first direction, and wherein said calculating the shift includes calculating the shift in color space of said peak wavelength.

14. The method of claim 9, wherein said first color of light differs from said second color of light by approximately one nanometer.

15. The method of claim 9, wherein said emitting a second color of light comprises changing the temperature of said first light emitter from the temperature of said first light emitter during emission of said first color of light.

16. The method of claim 9, wherein said emitting a second color of light comprises changing the current flow through said first light emitter from the current flow of said first light emitter during emission of said first color of light.

17. The method of claim 9, wherein said first light emitter is a light emitting diode.

18. A method of operating an illumination system, said illumination system comprising a plurality of light emitters and color sensors, said method comprising:
calibrating said illumination system, wherein said calibrating comprises:
emitting a first color of light having a first peak wavelength using a first of said plurality of light emitters;
measuring said first color of light using said plurality of color sensors;
emitting a second color of light having a second peak wavelength using said first light emitter;
measuring said second color of light using said color sensors;
calculating the shift in color space based on the measurements; and
calculating at least one first calibration matrix based on said shift in colors space;
receiving data regarding colors that are to be emitted by said illumination system; and
controlling said plurality of light emitters to emit said colors;
monitoring light emitted by said light emitters using said plurality of color sensors;
applying said at least one calibration matrix to data representative of the monitored light; and
transmitting instructions to said light emitters based on said data having said calibration matrix applied thereto.

19. The method of claim 18, wherein said emitting a second color of light comprises shifting the peak wavelength emitted by said at least one light emitter in a first direction.

20. The method of claim 19, and further comprising emitting a third color of light using said at least one light emitter, wherein said emitting a third color of light comprises shifting the peak wavelength emitted by said at least one light emitter in a second direction opposite said first direction, and wherein said calculating the shift includes calculating the shift in color space of said third color of light.

21. The method of claim 18, wherein said second color of light differs from said first color of light by approximately one nanometer.

22. The method of claim 18, wherein said emitting a second color of light comprises changing the temperature of said at least one light emitter from the temperature of said at least one light emitter during emission of said first color of light.

23. The method of claim 18, wherein said emitting a second color of light comprises changing the current flow through said at least one light emitter from the current flow of said at least one light emitter during emission of said first color of light.

24. The method of claim 18, wherein said at least one emitter is a light emitting diode.

* * * * *